United States Patent [19]

Grantham

[11] 4,246,255
[45] Jan. 20, 1981

[54] DISPOSAL OF PCB

[75] Inventor: LeRoy F. Grantham, Calabasas, Calif.

[73] Assignee: Rockwell International Corporation, El Segundo, Calif.

[21] Appl. No.: 25,814

[22] Filed: Apr. 2, 1979

[51] Int. Cl.$^2$ ............................ B01J 1/00; C01B 7/01
[52] U.S. Cl. .................................. 423/659; 423/210.5; 423/240; 423/245; 423/481; 423/DIG. 12
[58] Field of Search ..................... 423/210.5, 240, 245, 423/481, 659, DIG. 12

[56] References Cited

U.S. PATENT DOCUMENTS 3,845,190  10/1974  Yosim ................................... 423/184
4,140,066  2/1979  Rathjew .......................... 423/481 X Primary Examiner—Earl C. Thomas
Attorney, Agent, or Firm—L. Lee Humphries; Henry Kolin; Clark E. DeLarvin

[57] ABSTRACT

A process for the decomposition of polychlorinated biphenyls (PCB's) with negligible environmental pollution. The process comprises feeding the PCB and a source of oxygen to a molten salt comprising an alkali metal carbonate and preferably also an alkali metal sulfate to decompose the PCB by pyrolysis and oxidation. Some of the resulting decomposition products react with and are retained in the molten salt; the remaining gaseous products pass through the melt and are safely exhaustable to the atmosphere or, alternatively, the PCB is introduced into a first zone for partial pyrolysis and oxidation and then into a second reaction zone for further oxidation of any remaining combustible gases.

7 Claims, No Drawings

DISPOSAL OF PCB

BACKGROUND OF THE INVENTION

1. Field of the Invention

This invention relates to a process for the disposal of polychlorinated biphenyls. It particularly relates to a molten salt process for the pyrolytic and oxidative decomposition of PCB with negligible environmental pollution.

2. Prior Art

Polychlorinated biphenyls have high thermal stability, are substantially chemically inert and have a high dielectric constant, all of which make them desirable for use in various applications, such as fire resistant transformers and capacitors. The PCB's have been in use for decades and it is reported over a half million tons have been manufactured in the United States. Production of PCB was stopped when it was found that the substances were both toxic and suspected carcinogens. However, it has been estimated that 300 million pounds of these chemicals are in land fills and about 750 million pounds are still in use.

As a result of the toxicity and suspected carcinogenity of PCB's, the Environmental Protection Agency (EPA) has issued regulations governing their storage and the treatment required to effect their disposal. Most toxic organic chemicals are readily destroyable at temperatures of about 1000° C. with a residence time of two seconds by a combination of pyrolysis and oxidation reactions. However, it has been reported that the more toxic compounds, such as polychlorinated biphenyls, are also more stable and may require higher temperatures and longer residence times. Specifically, the EPA has determined that the effective destruction of PCB's by combustion requires certain criteria, namely, maintenance of the introduced liquids at a temperature of 1200° C. for a two-second dwell time and 3% oxygen in the stack gas or maintenance of the introduced liquid at a temperature of 1600° C. for one and one-half seconds dwell time and 2% excess oxygen in the stack gas. In addition, the regulations applicable to PCB's also apply to PCB-contaminated mixtures. Thus, in accordance with the EPA regulations, any liquid containing as little as 500 parts per million PCB must be stored and destroyed in accordance with EPA regulations.

It will be readily apparent to those skilled in the art that the high temperatures required in accordance with EPA regulations for the destruction of PCB necessitates the use of exotic and expensive materials of construction for an incinerator. Obviously, therefore, it would be desirable to develop a lower temperature process which would still provide for the complete destruction of the PCB with negligible environmental pollution. It would be even more desirable if such process could operate with a shorter residence time without any adverse effect on the destruction of the PCB, since a reduction in residence time would make it possible to use a much smaller incinerator for any given throughput of PCB.

SUMMARY OF THE INVENTION

In accordance with the present invention there is provided a simple, rapid waste control process for the ultimate disposal of polychlorinated biphenyls with negligible environmental pollution.

It is a further advantage of the present invention that it is possible to obtain complete decomposition of the PCB at substantially lower temperatures than were heretofore possible.

It is still another advantage of the present invention that substantially complete decomposition of the PCB is obtained with a much shorter residence time than was heretofore possible.

In accordance with the present invention, the PCB and a source of oxygen, such as gaseous oxygen and preferably air, are fed into a reaction zone containing a molten salt mixture maintained at a temperature of from about 700° to about 1000° C. and preferably between about 850° and 950° C. The molten salt mixture comprises a major amount of an alkali metal carbonate or mixture of alkali metal carbonates and preferably includes a minor amount of an alkali metal sulfate. The PCB is decomposed by pyrolysis and oxidation to form decomposition and combustion products including a gaseous effluent. The gaseous effluent consists essentially of carbon dioxide, water vapor, any excess oxygen and nitrogen when the source of oxygen is air. Alternatively, of course, the PCB could be partially decomposed and oxidized in a first zone to produce a gaseous effluent containing combustible organic matter which is introduced into a second zone for complete combustion or recovery of the combustible organic matter.

The molten salt combustion apparatus and technique applicable to the destruction of PCB have been found to be analogous to those reported in U.S. Pat. No. 3,845,190, Disposal of Organic Pesticides, issued Oct. 29, 1974, and assigned to the assignee of the present invention. Contrary to what was previously believed with regard to the higher temperatures and residence time required for PCB's, it has been found that polychlorinated biphenyls are readily disposed of in a manner similar to that disclosed in the referenced patent which relates solely to pesticides. Thus, the apparatus and the process disclosed therein are applicable to the present invention and the disclosure of said patent is incorporated herein by reference.

DESCRIPTION OF THE PREFERRED EMBODIMENT

In accordance with the present invention, the PCB's decompose in a molten salt which may consist essentially of only an alkali metal carbonate but preferably also contains alkali metal sulfate. In addition, the salt will, of course, include the decomposition products of the PCB. More particularly, the chlorine constituent reacts with the carbonate to form an alkali metal chloride which is retained in the molten salt.

The term "polychlorinated biphenyl" is used herein is defined as a chemical substance containing only a biphenyl molecule that has been chlorinated to varying degrees. The polychlorinated biphenyl may be a single chemical compound, a mixture of different types of PCB's and also includes other organic substances containing as little as 50 parts per million PCB or less. The polychlorinated biphenyl may be either a solid or a liquid. While the invention is described with respect to the polychlorinated biphenyls which are of the greatest economic significance, it will be apparent to those versed in the art that the invention also would be applicable to other polyhalogenated biphenyls, such as, for example, a polybrominated biphenyl. An examplary list of polychlorinated biphenyls suited for treatment in accordance with the present invention is set forth in Table 1 below.

TABLE 1

2-chlorobiphenyl
3-chlorobiphenyl
4-chlorobiphenyl
2,2'-dichlorobiphenyl
3,3'-dichlorobiphenyl
4,4'-dichlorobiphenyl
3,5-dichlorobiphenyl
2,5-dichlorobiphenyl
3,4-dichlorobiphenyl
2,3-dichlorobiphenyl
2,4'-dichlorobiphenyl
2,4,5-trichlorobiphenyl
2,3,5-trichlorobiphenyl
2,4,4'-trichlorobiphenyl
2,5,4'-trichlorobiphenyl
3,5,4'-trichlorobiphenyl
3,4,2'-trichlorobiphenyl
3,5,2'-trichlorobiphenyl
3,4,3',4'-tetrachlorobiphenyl
3,4,2',5'-tetrachlorobiphenyl
2,6,2',6'-tetrachlorobiphenyl
2,5,3',5'-tetrachlorobiphenyl
2,4,2',4'-tetrachlorobiphenyl
2,4,2',5'-tetrachlorobiphenyl
2,4,5,3',4'-pentachlorobiphenyl
3,4,5,3',4',5'-hexachlorobiphenyl
2,4,6,2',4',6'-hexachlorobiphenyl
2,3,4,5,2',4',5'-heptachlorobiphenyl
2,3,5,6,2',3',5',6'-octachlorobiphenyl
2,3,4,5,6,2',3',4',5',6'-decachlorobiphenyl The molten salt may comprise a single alkali metal carbonate or a low melting binary or ternary mixture of alkali metal carbonates. For example, the ternary alkali metal carbonate eutectic melts at 397± 1° C. and consist of 43.5, 31.5 and 25 mole percent of the carbonates of lithium, sodium and potassium respectively. A preferred binary mixture is the sodium carbonate-potassium carbonate eutectic which melts at 710° C. Advantageously, the molten salt also contains an alkali metal sulfate which may consist of one or more of the sulfates of the foregoing alkali metals. In general, sodium sulfate is preferred because of its ready availability and low cost. An advantage of having sodium sulfate present is it appears to lower the temperature required to achieve substantially complete destruction of the PCB.

A particularly preferred molten salt, based on cost and availability as well as operating temperature, is one initially consisting essentially of sodium carbonate and containing from about one to 25 wt.% sodium sulfate. With this composition it is possible to obtain complete destruction of the PCB at a temperature of from about 850° to 950° C. and in a time of less than about one second.

The PCB is introduced into the molten salt which is maintained at a temperature within the range of from about 700°-1000° C. and preferrably at a temperature of from about 850°-950° C. The residence time required to effect complete destruction of the PCB is in the range of from about 0.2-1 second. Generally, substantially complete destruction or decomposition of the PCB is obtained within a time of from about 0.2-0.8 seconds. The pressure at which the decomposition is effected is not particularly critical and may range from as low as atmospheric up to 30 atmospheres or more. Higher pressure does, of course, permit a higher throughput for a given size combustor, all other things being equal. Generally a pressure in the range of from about 1-30 atmospheres is preferred in the interest of minimizing combustor size and maximizing the economy of operation. The oxygen introduced into the molten salt may be either substantially pure oxygen, oxygen-enriched air, air or any other source of molecular oxygen for reaction with the organic constituent of the PCB.

The ratio of PCB to molten alkali metal carbonate is not particularly critical provided that there is always present in the molten salt a sufficient amount of carbonate to react with and absorb the chlorine constituent of the PCB and any other halogen constituents which may be present in a PCB mixture. Obviously, of course, the PCB should be introduced in a manner to thoroughly mix with the molten salt. Thus, it generally is preferred to introduce both the PCB and the source of oxygen into a lower part of the molten salt to induce agitation and intimate mixing of the reactants.

Where complete destruction of the PCB in one zone is desired, air is preferred in the interest of economy and is supplied in an amount to provide 100% or more of the stoichiometric requirement for complete destruction or oxidation of all the hydrogen and carbon constituents of the PCB. In some instances, it may be desirable to have two reaction zones. For example, as taught in assignee's U.S. Pat. Nos. 3,916,617 and 4,017,271, which relate to the gasification of a carbonaceous material, it is possible to react a carbonaceous material and a deficient amount of air in a molten salt medium and provide an off-gas rich in hydrogen, carbon monoxide and methane. This combustible off-gas then is utilizable as a source of fuel for the production of heat in a remote location or alternatively further processing to produce a pipeline grade of gas or introduced into some other synthesis process. Thus, it is seen that the present invention provides not only a means by which the PCB may be safely decomposed and destroyed but also a means by which useful heat and energy can be extracted from it safely and without any environmental pollution.

The following example is set forth to further illustrate the practice of the present invention and should not be construed as limiting it in scope.

EXAMPLE

The molten salt combustor comprised a 6 inch ID by 36 inch long alumina vessel located within a thick walled stainless steel vessel which was in turn contained within an electrically heated furnace. The selected alkali metal salt was introduced into the alumina vessel and the heater was turned on to heat the salt to a desired temperature. Thereafter, PCB and air were introduced into a bottom portion of the salt. The composition of the off-gas was monitored by passing a sample continuously through a calibrated nondispensive-infrared hydrocarbon, carbon dioxide and carbon monoxide meter. The oxygen and nitrogen oxides also were continuously monitored as well as the $No_x$ content. In addition, periodically, samples of the off-gas were injected into a calibrated gas chromatograph as a check on the off-gas readings obtained from the continuous monitoring instrument. The average reaction time for the PCB and salt varied from about 0.25 to 0.5 seconds.

The PCB utilized was obtained from a high voltage transformer which originally was manufactured in the early 1960's. The PCB was liquid at ambient temperature and comprised a mixture of pentachlorobiphenyl (70 wt.%) and trichlorobenzene (30 wt.%). A small amount of phenoxypropene oxide scavenger (0.2 wt.%) was also present. The PCB elemental composition was 42.8 wt.% C., 1.6 wt.% hydrogen and 55.6 wt.% chlorine. The results of these tests are set forth in the Tables below.

TABLE 2

PCB COMBUSTION EFFICIENCY
SODIUM CARBONATE-CHLORIDE MELTS

| Temp. (°C.) | Stoich. Air (%) | NaCl in Melt (wt.%) | Part. Loading (Mg/M$^3$) | PCB in Off-gas ($\mu$G/M$^3$) | PCB Destruction (%) |
|---|---|---|---|---|---|
| 980 | 217 | 6 | 0.46 | ND<64 | ND>99,99996 |
| 970 | 140 | 10 | 0.92 | ND<43 | ND>99,99995 |
| 900 | 230 | 18 | 0.74 | ND<70 | ND>99,99990 |

ND = None detected

TABLE 3

PCB COMBUSTION TESTS
Na$_2$CO$_3$—NaCl MELTS
WITH SODIUM SULFATE CATALYST

| Temp. (°C.) | Stoich. Air (%) | NaCl in Melt (wt.%) | Part. Loading (Mg/M$^3$) | PCB in Off-gas ($\mu$G/M$^3$) | PCB Destruction (%) |
|---|---|---|---|---|---|
| 940 | 200 | 32 | 0.78 | ND<50 | ND>99,99996 |
| 880 | 150 | 38 | 0.65 | ND<55 | ND>99,99995 |
| 865 | 230 | 44 | 0.30 | ND<60 | ND>99,99992 |

ND = None detected

From the foregoing Tables, it is seen that the present invention provides a process wherein polychlorinated biphenyl is readily destroyed at temperatures of less than 1000° C. and a residence time of less than one second. In addition, when the PCB is destroyed in accordance with the present invention, the waste streams, i.e., off-gas and molten salt, are substantially nonpolluting. Specifically, the off-gas consists essentially of CO$_2$, water vapor, excess oxygen and nitrogen when air is used as the source of oxygen. The spent salt will comprise sodium carbonate, sodium chloride from decomposition of the PCB, and any initial sodium sulfate content, plus any sodium sulfate formed from sulfur contained in the PCB or organic carrier in the case of a PCB mixture.

While the example illustrating this invention has been described with respect to certain specific types of PCB, temperatures, molten salts and other reactive conditions, and what is now considered to represent the best embodiment has been illustrated and described; the invention may be otherwise practiced within the scope of the teachings set forth as will be readily apparent to those skilled in the art. Accordingly, this invention is not to be limited by the illustrative and specific embodiments thereof, but the scope should be determined in accordance with the following claims.

What is claimed is:

1. A process for the decomposition of a polychlorinated biphenyl resulting in negligible environmental pollution comprising feeding the polychlorinated biphenyl and a source of oxygen into a pool of a molten salt maintained at a temperature between 700° and 1000° C., and salt comprising an alkali metal carbonate or a mixture of alkali metal carbonates to thermally decompose and at least partially oxidize said polychlorinated biphenyl to form decomposition products including a gaseous effluent and venting said gaseous effluent product consisting essentially only of gases selected from carbon dioxide, water vapor, oxygen and nitrogen to the atmosphere while retaining the remaining decomposition products of the polychlorinated biphenyl in the melt.

2. The process of claim 1 wherein the molten salt mixture is maintained at a temperature of between about 850° and 950° C. and consists essentially of sodium carbonate containing from about one to 25 wt.% sodium sulfate.

3. The process of claim 1 wherein the molten salt mixture initially consists essentially of sodium carbonate.

4. The process of claim 1 wherein the source of oxygen comprises air.

5. The process of claim 4 wherein the air is enriched with gaseous oxygen.

6. The process of claim 4 wherein the molten salt mixture is maintained at a temperature of between 850° and 950° C.

7. The process of claim 1 wherein said polychlorinated biphenyl is partially oxidized in a first reaction zone and subsequently passed into a second reaction zone for complete oxidation prior to venting said gaseous effluent to the atmosphere.

* * * * *

UNITED STATES PATENT AND TRADEMARK OFFICE
CERTIFICATE OF CORRECTION

PATENT NO. : 4,246,255
DATED : January 20, 1981
INVENTOR(S) : LeRoy F. Grantham

It is certified that error appears in the above-identified patent and that said Letters Patent are hereby corrected as shown below:

Front Page, under [56] References Cited, "Yosim" should read --Yosim et al--; "Rathjew" should read --Rathjen et al--.

Column 6, line 15, "and salt" should read --said salt--.

Signed and Sealed this

Fourteenth Day of July 1981

[SEAL]

Attest:

GERALD J. MOSSINGHOFF

Attesting Officer

Commissioner of Patents and Trademarks